United States Patent
Mühlfeld et al.

(10) Patent No.: US 6,573,341 B2
(45) Date of Patent: Jun. 3, 2003

(54) MOLDED POLYURETHANE BODY

(75) Inventors: Horst Mühlfeld, Grasellenbach (DE); Thomas Schauber, Hemsbach (DE); Silke Wagener, Weinheim (DE)

(73) Assignees: Carl Freudenberg KG, Weinheim (DE); Magna Eybl Systemtechnik GmbH, Straubing (DE)

( * ) Notice: Subject to any disclaimer, the term of this patent is extended or adjusted under 35 U.S.C. 154(b) by 0 days.

(21) Appl. No.: 09/866,298

(22) Filed: May 25, 2001

(65) Prior Publication Data

US 2002/0004563 A1 Jan. 10, 2002

(30) Foreign Application Priority Data

May 26, 2000 (DE) .......................................... 100 25 932

(51) Int. Cl.$^7$ .............................................. C08G 18/72
(52) U.S. Cl. ...................... 525/457; 525/456; 525/458; 525/453; 525/528; 525/440
(58) Field of Search ................................. 525/456, 457, 525/458, 453, 528, 440

(56) References Cited

U.S. PATENT DOCUMENTS 5,455,312 A * 10/1995 Heidingsfeld et al.
6,350,530 B1 * 2/2002 Morikawa et al.
6,353,078 B1 * 3/2002 Murata et al.

FOREIGN PATENT DOCUMENTS

DE 26 58 136 6/1978
DE 42 03 307 12/1992

OTHER PUBLICATIONS

G. Woods; Polyurethanes; 1990; pp. 181–182.*
H. Ulrich; Chemistry and Technology of Isocyanates; 1996; p. 315.*

* cited by examiner

Primary Examiner—Rachel Gorr
(74) Attorney, Agent, or Firm—Kenyon & Kenyon

(57) ABSTRACT

A molded polyurethane body is obtainable by reacting:
a) one or more aliphatic polyols having a molecular weight of 450 to 6000 g/mol and a hydroxyl value of 10 to 235;
b) with aliphatic and/or cycloaliphatic diisocyanates in an equivalent ratio of diisocyanate to polyol of 1.2:1.0 to 16.0:1.0;
c) with diols as chain lengthening agents having a molecular weight of 60 to 450 g/mol, the NCO index formed from the quotient, which is multiplied by 100, of the equivalent ratio of isocyanate groups to the sum of the hydroxyl groups of polyol and chain lengthening agents lying within a range of 90 to 105; and
d) with an at least bifunctional reaction component, which is suitable for subsequent cross-linking.

9 Claims, No Drawings

MOLDED POLYURETHANE BODY

FIELD OF THE INVENTION

The present invention relates to a molded polyurethane body having high light fastness as well as improved temperature stability.

BACKGROUND INFORMATION

German Published Patent Application Nos. 26 58 136 and 42 03 307 describe thermoplastic, processable molding materials are made of mixtures of different aliphatic polyols and 1,6 hexamethylene diisocyanate having chain lengthening means such as 1,4 butane diol. The polyurethane molding materials described can be used, in particular, for manufacturing food packaging, but also for manufacturing films for decorative purposes.

However, using such polyurethane molding materials in the interior of motor vehicles is not guaranteed due to the automobile industry's increased demands on the materials used to produce dashboard coatings, according to which these materials must possess grain stability and hot-light stability of at least 130° C.

Also for use as food packaging or as molded bodies for hygienic or medicinal purposes, the ability to sterilize using superheated steam is not sufficient.

SUMMARY OF THE INVENTION

It is an object of the present invention to provide a molded polyurethane body and a method for its manufacture and use, the molded body having high hot-light fastness as well as improved dimensional heat stability.

These and other beneficial objects of the present invention are achieved by providing a molded polyurethane body obtained by reacting: a) one or more aliphatic polyols having a molecular weight of 450 to 6000 g/mol and an hydroxyl value of 10 to 235; with b) aliphatic and/or cycloaliphatic diisocyanates in an equivalent ratio of diisocyanate to polyol of 1.2:1.0 to 16.0:1.0; with c) diols as chain lengthening agents having a molecular weight of 60 to 450 g/mol, the NCO index formed from the quotient, which is multiplied by 100, of the equivalent ratio of isocyanate groups to the sum of the hydroxyl groups of polyol and chain lengthening agents lying within a range of 90 to 105; and with d) an at least bifunctional reaction component, which is suitable for subsequent cross-linking, and which reacts with the terminal hydroxyl groups of the polyurethane chain as well as with the acidic hydrogen atoms of the urethane groups and leads to branched-chain reactions, the thermoplastic polyurethane formed by conversion from the components a) through c) in a first step being homogenously mixed in a second step with 0.2 to 25 parts by weight of component d) with respect to 100 parts by weight of the thermoplastic polyurethane, formed into a molded body, and subsequently cross-linked at temperatures from 80 to 240° C.

DETAILED DESCRIPTION OF THE INVENTION

It has been discovered that aliphatic, linear, long-chain, thermoplastic polyurethanes are significantly improved by adding a latently reactive cross-linking component that under processing conditions at increased temperatures results in a higher molecular, branched polyurethane. In particular, the molded polyurethane bodies according to the present invention have higher temperature stability, hot-light stability, as well as dimensional heat stability, which are mirrored in the following advantageous properties:

improved processability in thermoplastic manufacturing processes, such as injection molding, melt extrusion, melt spinning methods, sintering methods, hot-melt adhesive methods.

improved crystallization properties, particularly quick recrystallization for an economical manufacturing process in the aforementioned methods.

high tensile strength, tear initiation strength, and resistance to further tearing.

improved elastic properties.

According to the present invention, molded polyurethane bodies are manufactured in that a thermoplastic polyurethane molding material is produced from components a) through c) recited above and well homogenized in a powdered or granular form with component d) recited above, and in that the homogenized material is formed into a molded body and subsequently cross-linked at temperatures of 80 to 240° C. The thus manufactured molded polyurethane body possesses improved physical properties and elastic properties and high light fastness. Furthermore, they are dimensionally stable up to at least 150° C., i.e., they do not show any changes in grain stability when used as surface materials.

Preferably, the molded polyurethane bodies are produced in that component d) is applied in a liquid, paste-like, or solid form at room temperature in a tumbling mixer by tumbling on the thermoplastic, polyurethane molding material obtained from components a) through c). The shelf life of the mixture of thermoplastic, polyurethane molding material and cross-linking component d) depends on their reactivity. A mixture of a liquid, aliphatic diisocyanate or triisocyanate may, for example, be processed as a cross-linking component within 24 hours storage time at room temperature under the same processing conditions in the thermoplastic method, while mixtures having solid, dimeric isocyanates or end-group-blocked isocyanates as cross-linking components are stable in storage at room temperature for several months. The mixture of the thermoplastic, polyurethane molding material obtained from components a) through c) and from cross-linking component d) is processed in a thermoplastic method at an increased temperature. As a result of the thermoplastic polyurethane and the cross-linking component simultaneously fusing and flowing together, an additional intimate mixture of components is attained. The cross-linking component is activated at the increased temperatures, and as a result, the active hydrogen groups are subsequently cross-linked by urethane bonds such as hydroxyl groups. The transformation to the molded polyurethane body according to the present invention and having increased dimensional heat stability is completed according to the reactivity of the cross-linking component either immediately following the manufacturing process or first after several days of storage time.

The molded polyurethane bodies obtainable according to the present invention do not have any mechanical or process engineering disadvantages with respect to conventional aliphatic thermoplastically processable polyurethane molding materials, as the following examples show. In the application according to the present invention as surface materials, the molded polyurethane bodies include the following advantages:

dry, leather-like feel.

improved resistance to solvents and cleaning agents.

reduced sensitivity to scratches.

improved resistance to abrasion.

Furthermore, in their use as a hot-melt adhesive or an adhesive material for textile purposes, the molded polyurethane bodies according to the present invention exhibit:

improved fastness to washing and cleaning.

improved adhesion at higher temperatures.

During their manufacture, the molded polyurethane bodies according to the present invention may be mixed with conventional filler agents and loading materials, flameproofing agents and anti-ageing agents, as well as processing aids and pigments.

The invention is described further with reference to the following examples:

EXAMPLE 1

Composition of the Mixture:

100.00 parts by weight of polycaprolactone having a molecular weight of 2,000 and an hydroxyl value of 56.0;

15.57 parts by weight of 1,6 hexane diol;

30.00 parts by weight of 1,6 hexamethylene diisocyanate.

Manufacturing Process

Step 1

Polycaprolactone, 1,6 hexane diol, and 1,6 hexamethylene diisocyanate are heated to 80° C. while being mixed in a reaction vessel. As a result of the exothermic reaction, the temperature rises to 180° C. in approximately 12 minutes. At this temperature, the product is poured onto a polytetrafluoroethylene film. After approximately 8 hours, the produced plate may be processed into a granular material.

The thus obtained thermoplastic polyurethane includes the following melting properties:

Melting point: 160° C.;

Melt index in accordance with DIN ISO 1133 under a 2.16 kg load; measured at 170° C.: 17 g/10 min;

measured at 200° C.: 60 g/10 min;

measured at 220° C.: 144 g/10 min.

Step 2

100.00 parts by weight of the thermoplastic polyurethane from Step 1 are mixed with 8.00 parts by weight of a triisocyanate having a molecular weight of 478 g/mol and an isocyanate content of 16% by weight (condensation product of hexamethylene diisocyanate having a biuret structure) for one hour at room temperature in a tumble mixer. Subsequently, the powdery material, which is still capable of flowing, is sintered according to the conventional powder-slush method in an open, heated mold at a temperature of about 225° C. to form a 1 mm-thick film.

The following properties were established for this material:

Melting point: 190° C.;

Melt index in accordance with DIN ISO 1133 under a 2.16 kg load; measured at 170° C.: not measurable;

measured at 200° C.: not measurable;

measured at 220° C.: 8 g/10 min;

heat aging of a molded part in 500 hours at 140° C.: no change on the surface, no melting of the grain structure;

hot-light aging in 500 hours at 130° C.: no discoloration, no change on the surface, no melting of the grain structure.

EXAMPLE 2

Step 1

A thermoplastic polyurethane was produced in accordance with Step 1 of Example 1.

Step 2

100.00 parts by weight of the thermoplastic polyurethane from Step 1 are reacted with 10.00 parts by weight of a dimeric isocyanate based on isophorone diisocyanate having a uretdione structure and an isocyanate content of 16% by weight analogously to Example 1.

The following properties were established for this material: Melting point: 190° C. to 195° C.;

Melt index in accordance with DIN ISO 1133 under a 2.16 kg load; measured at 170° C.: not measurable;

measured at 200° C.: not measurable;

measured at 220° C.: 65 g/10 min;

heat aging of a molded part in 500 hours at 140° C.: no change on the surface, no melting of the grain structure;

hot-light aging in 500 hours at 130° C.: no discoloration, no change on the surface, no melting of the grain structure.

EXAMPLE 3

Step 1

A thermoplastic polyurethane was produced in accordance with Step 1 of Example 1.

Step 2

100.00 parts by weight of the thermoplastic polyurethane from Step 1 are reacted with 3.00 parts by weight of paraformaldehyde analogously to Example 1. The following properties were established for this material:

Melting point: no longer capable of being melted;

Melt index in accordance with DIN ISO 1133 under a 2.16 kg load; measured at 170° C.: not measurable;

measured at 200° C.: not measurable;

measured at 220° C.: not measurable;

heat aging of a molded part in 500 hours at 140° C.: no change on the surface, no melting of the grain structure;

hot-light aging in 500 hours at 130° C.: no discoloration, no change on the surface, no melting of the grain structure.

COMPARATIVE EXAMPLE

A thermoplastic polyurethane obtained according to Step 1 of Example 1 is used as a comparative example.

The comparative material exhibited a lower melting point and measurable melt indices for the entire measured temperature range, as well as changes on the surface and in the grain structure in response to heat aging and hot-light aging starting at 120° C.

What is claimed is:

1. A molded polyurethane body obtained by reacting
   a) a polycaprolactone;
   b) with a 1,6 hexamethylene diisocyanate;
   c) with a 1,6 hexane diol; and
   d) with a triisocyanate suitable for cross-linking and having a molecular weight of 478 g/mol and an isocyanate content of 16% by weight, the thermoplastic polyurethane formed by conversion from the components a) through c) in a first step being homogeneously mixed in a second step, using a tumbling mixer, with 8 parts by weight of component d) with respect to 100 parts by weight of the thermoplastic polyurethane, formed into a molded body, and subsequently cross-linked at temperatures from 80 to 240° C., wherein the polyurethane body is dimensionally stable up to at least 150° C.

2. A molded polyurethane body obtained by reacting
   a) a polycaprolactone;
   b) with a 1,6 hexamethylene diisocyanate;
   c) with a 1,6 hexane diol; and
   d) with a dimeric isocyanate based on isophorone diisocyanate having a uretdione structure and an isocyanate content of 16% by weight, the thermoplastic polyurethane formed by conversion from the components a) through c) in a first step being homogeneously mixed in a second step with 10 parts, using a tumbling mixer, by weight of component d) with respect to 100 parts by weight of the thermoplastic polyurethane, formed into a molded body, and subsequently cross-linked at temperatures from 80 to 240° C., wherein the polyurethane body is dimensionally stable up to at least 150° C.

3. The molded polyurethane body of claim 1 wherein the body is selected from the group consisting of: i) a surface material for application in the interior of a motor vehicle, ii) a packaging for food, iii) a molded body or film for hygienic or medicinal application, and iv) a hot melt-adhesive or adhesive material for textile application.

4. The molded polyurethane body of claim 2 wherein the body is selected from the group consisting of: i) a surface material for application in the interior of a motor vehicle, ii) a packaging for food, iii) a molded body or film for hygienic or medicinal application, and iv) a hot melt-adhesive or adhesive material for textile application.

5. A method for producing a molded polyurethane body according to claim 2, comprising the steps of producing a thermoplastic polyurethane molding material from components a) through c) and well homogenizing the polyurethane molding material in a powdered or granular form with component d), and forming the homogenized material into a molded body and subsequently cross-linking at temperatures of 80 to 240° C., wherein component d) is applied in a liquid, paste-like, or solid form at room temperature in a tumbling mixer by tumbling on the thermoplastic, polyurethane molding material obtained from the components a) through c) in the first step.

6. A surface material for application in the interior of a motor vehicle comprising the molded polyurethane body obtained according to claim 2.

7. A packaging for food comprising the molded polyurethane body obtained according to claim 2.

8. A molded body or film for a hygienic or medicinal application comprising the molded polyurethane body obtained according to claim 2.

9. A hot-melt adhesive or adhesive material for textile applications comprising the molded polyurethane body obtained according to claim 2.

* * * * *